United States Patent [19]
Carlyle

[11] Patent Number: 5,816,386
[45] Date of Patent: Oct. 6, 1998

[54] FLUIDIZER CONVEYOR

[75] Inventor: Allan M. Carlyle, 5587 Heather Street, Vancouver, Canada, V5Z 3N3

[73] Assignee: Allan M. Carlyle, Vancouver, Canada

[21] Appl. No.: 680,088

[22] Filed: Jul. 15, 1996

[51] Int. Cl.$^6$ ................................................. B65G 27/22
[52] U.S. Cl. .......................................... 198/768; 198/761
[58] Field of Search ................................. 198/753, 761, 198/764, 768

[56] References Cited

U.S. PATENT DOCUMENTS

| | | | |
|---|---|---|---|
| 3,789,977 | 2/1974 | Musschoot | 198/220 BC |
| 4,088,223 | 5/1978 | Bertrand | 198/761 |
| 4,128,161 | 12/1978 | Yonkers | 198/761 |
| 4,192,419 | 3/1980 | Brodin | 198/750 |
| 4,194,611 | 3/1980 | Mukhin et al. | 193/2 B |
| 4,256,014 | 3/1981 | Kroger | 91/216 B |
| 4,267,919 | 5/1981 | Schrader | 198/756 |
| 4,505,380 | 3/1985 | McLemore et al. | 198/750 |
| 4,548,623 | 10/1985 | Naske | 55/233 |
| 4,593,603 | 6/1986 | Johnson | 91/265 |
| 4,858,749 | 8/1989 | Musschoot | 198/756 |
| 4,909,379 | 3/1990 | Albeck et al. | 198/769 |
| 5,178,259 | 1/1993 | Musschoot | 198/753 |
| 5,211,277 | 5/1993 | Mount | 198/358 |
| 5,404,996 | 4/1995 | Durnil | 198/761 |

FOREIGN PATENT DOCUMENTS

| | | | |
|---|---|---|---|
| 1233427 | 3/1988 | Canada . | |
| 1240918 | 8/1988 | Canada . | |
| 1255631 | 6/1989 | Canada . | |
| 1273319 | 8/1990 | Canada . | |
| 2836755 | 3/1979 | Germany | 198/768 |
| 578238 | 10/1977 | U.S.S.R. | 198/768 |
| 772946 | 10/1980 | U.S.S.R. | 198/768 |

*Primary Examiner*—James R. Bidwell

[57] ABSTRACT

A vibratory conveyor capable of fluidizing particulate material permits control of direction, speed and fluidization of the material. The material is placed on a conveyor and vibrated by a linear vibrator which provides horizontal and vertical components of vibrational forces in a direction of movement. The amplitude and frequency of vibration are controlled to maintain a predetermined degree of fluidization. The vector angle of the linear vibrator is positioned to define a predetermined speed and direction of movement of the material on the conveyor.

12 Claims, 4 Drawing Sheets

FLUIDIZER CONVEYOR

TECHNICAL FIELD

The present invention relates to a vibratory conveyor capable of fluidizing particulate material and more specifically to a conveyor that allows variations in the degree of fluidization of a particulate material on a vibratory conveyor together with variations in the speed and direction of the material on the conveyor.

BACKGROUND ART

Shaker or vibratory conveyors are commonly used for transporting particulate material and may be used for drying particulate material. When used for drying, the degree of fluidization of the material is important to allow drying gas to pass therethrough or circulate around. Such conveyors invariably have troughs or pans which may or may not be perforated dependent upon their use. In existing perforated trough conveyors used for drying, the degree of fluidization is dependent at least partly on the gas flow and the retention time of the particulate material being conveyed is dependent upon the speed the material moves in the trough together with the length of the trough.

Fluidizer conveyors have troughs that are vibrated by mechanical, electrical, pneumatic or hydraulic devices. These include hinged rocker arms, eccentrically loaded wheels, pulsating magnets or pneumatic or hydraulic cylinders.

A review of other available designs for fluidizing with vibrations reveals a fixed relationship between the vertical component for fluidization and the horizontal component for material velocity in the conveyor trough. Typical equipment includes eccentrically weighted motors for conveyor troughs, supported by inclined struts or springs which are caused to rapidly reciprocate horizontally. The vertical and horizontal components of the vibration forces are a function of the sine and cosine of the angle of the supporting strut or spring, or the angle of the axis of the eccentric motor.

Eccentrically weighted motors are used on large helical feeders where control of material velocity is the only requirement. Such motors cannot be too large otherwise the vibration forces produced may become destructive. These vibration forces act in a plane of rotation of 360° whereas the useful vertical forces needed are substantially in a single vertical plane. Thus, there are unproductive vibration forces that if excessive cause damage to the structure. Some designs overcome these problems by providing pairs of eccentric weights positioned to offset the horizontal forces.

It is an aim of the present invention to direct substantially planar vibration to a conveyor. Both horizontal and vertical components of vibrational forces are directed to the conveyor. It is a further aim of the present invention to separately control the frequency and amplitude of vibration and at the same time separately control the vector angle in the plane of vibration. Thus, one is able to control the degree of fluidization and the speed of particulate material in a vibrating trough, also one is able to control the direction of the particulate material moving in the trough.

DISCLOSURE OF INVENTION

The present invention provides control of the amplitude and frequency of vibration applied to a conveyor together with control of the vector angle determining the magnitude and direction of the horizontal component of vibration, and the magnitude of the vertical component. By utilizing these three variables, amplitude, frequency and vector angle, one is able to determine the degree of fluidization of particulate material, together with the speed and direction of the particulate material on the conveyor trough. Thus the drying of the particulate material can be controlled and varied depending upon the requirements for different types of particulate materials at different moisture contents. The residence time for the particulate material on the conveyor trough may be controlled with various degrees of fluidization and drying gas pressure. The retention time for the particulate material is a function of the length of the conveyor trough.

The present invention provides a fluidizer conveyor comprising a trough to hold and convey a particulate material in a plane of movement, at least one linear vibrator preferably a reciprocating vibrator hydraulic cylinder with a first pivotal support under the trough and a second pivotal support on a base, the hydraulic cylinder being positioned so that the particulate material moves in the plane of vibratory movement, first control means for the vibrator hydraulic cylinder to control amplitude of vibration, second control means for the vibrator hydraulic cylinder to control frequency of vibration, at least one variable length vector link pivotally mounted between the trough and the base in the plane of movement, and vector positioning control means to vary the length of the vector link to determine a vector angle of the vibrator hydraulic cylinder in the plane of movement. The term "linear vibrator" or "linear vibrating means" used throughout the text refers to a vibrating device such as a hydraulic cylinder which reciprocates on a single plane.

The present invention also provides a method of conveying particulate material on a conveyor trough, comprising the steps of: placing particulate material on a conveyor trough, vibrating the conveyor trough by a combination of horizontal and vertical components of vibrational forces applied by a linear vibrating means in a direction of movement of the particulate material on the conveyor trough, controlling the amplitude and frequency of vibration to maintain a predetermined degree of fluidization of the particulate material on the conveyor trough, and positioning the linear vibrating means at a vector angle to define a predetermined speed and direction of the particulate material on the conveyor.

BRIEF DESCRIPTION OF DRAWINGS

In drawings which illustrate embodiments of the present invention.

MODES FOR CARRYING OUT THE INVENTION

Figure 1:
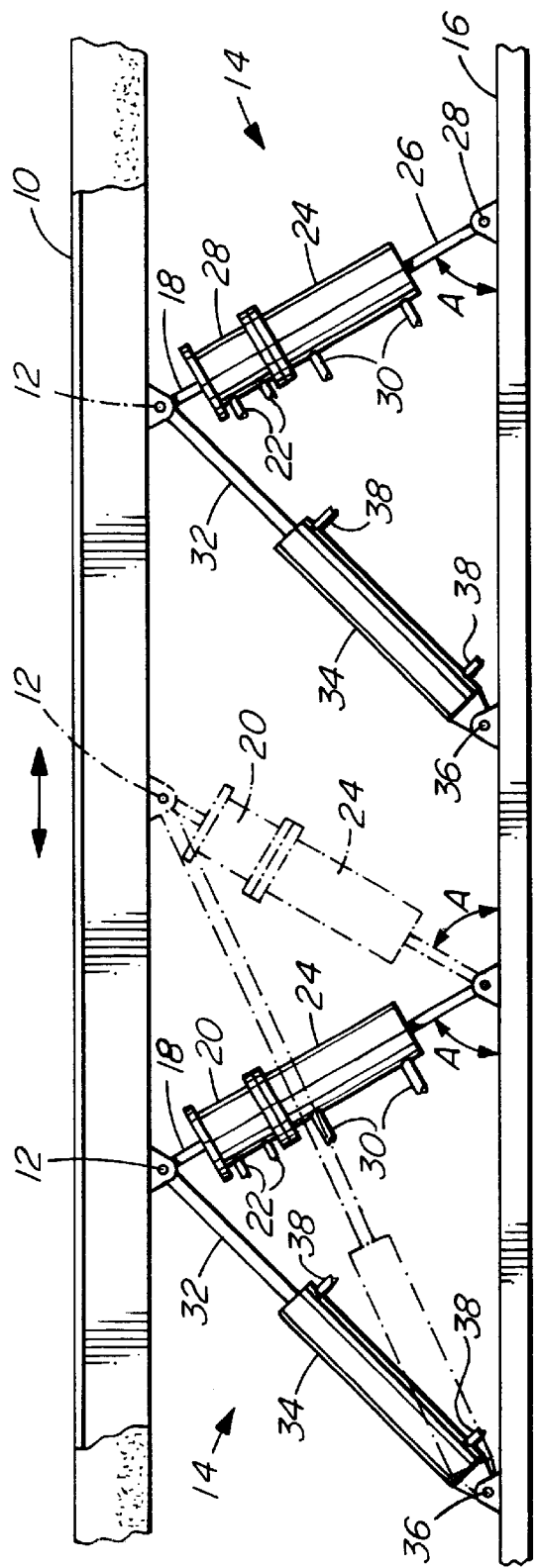
FIG. 1 is a side elevational view showing a linear conveyor trough supported by two reciprocating vibrator hydraulic cylinders.

A fluidizer conveyor is shown in FIG. 1 with a substantially horizontal trough 10 having two first pivotal supports 12 positioned underneath for connection to the assembled vibrating devices 14. Whereas two vibrating devices 14 are shown, a single vibrating device may be used or, alternatively, more than two vibrating devices may be used depending upon the length of the conveyor trough 10. The conveyor trough 10 is shown as being substantially horizontal, however, the trough 10 may be sloped depending upon the requirements. The vibrating devices 14 are supported from a heavy base plate 16 which is substantially fixed, thus the vibration occurs only in the trough 10 and the heavy base plate 16 does not move.

Attached to each of the first pivotal supports 12 on the conveyor trough 10 is a piston arm 18 of a reciprocating vibrator hydraulic cylinder 20. The cylinder 20 is double acting having hydraulic connections 22 at top and bottom. On the same axis as the vibrator cylinder 20 is a length adjuster hydraulic cylinder 24 with piston arm 26 connected to a second pivotal support 28 attached to the base 16. The length adjuster cylinder 24 is also a double acting cylinder having two hydraulic connections 30 at top and bottom. This length adjuster cylinder 24 permits the distance between the first pivotal support 12 and the second pivotal support 28 to be varied depending upon the angle of the vibrator cylinder 20 to the base plate 16. The length adjuster cylinder 24 allows the use of a small volume vibrator hydraulic cylinder 20.

Connected to the first pivotal support 12 underneath the conveyor trough 10 is a piston arm 32 from a vector hydraulic cylinder 34 which extends to a third pivotal support 36 positioned on the base plate 16. The vector cylinder 34 is double acting and has hydraulic connections 38 at the top and bottom. By moving the piston arm 32 in the vector cylinder 34, one is able to vary the angle A of the vibrator cylinder 20 relative to the base plate 16. The length adjuster cylinder 24 works in conjunction with the vector cylinder 34 so that the height or distance apart between the trough 10 and the base plate 16 remains substantially the same as the angle A is varied. As shown in dotted lines, the angle A is negative compared with a positive angle shown in full lines. This change of angle between positive and negative determines the direction of movement of the particulate material on the conveyor trough 10.

Figure 3:
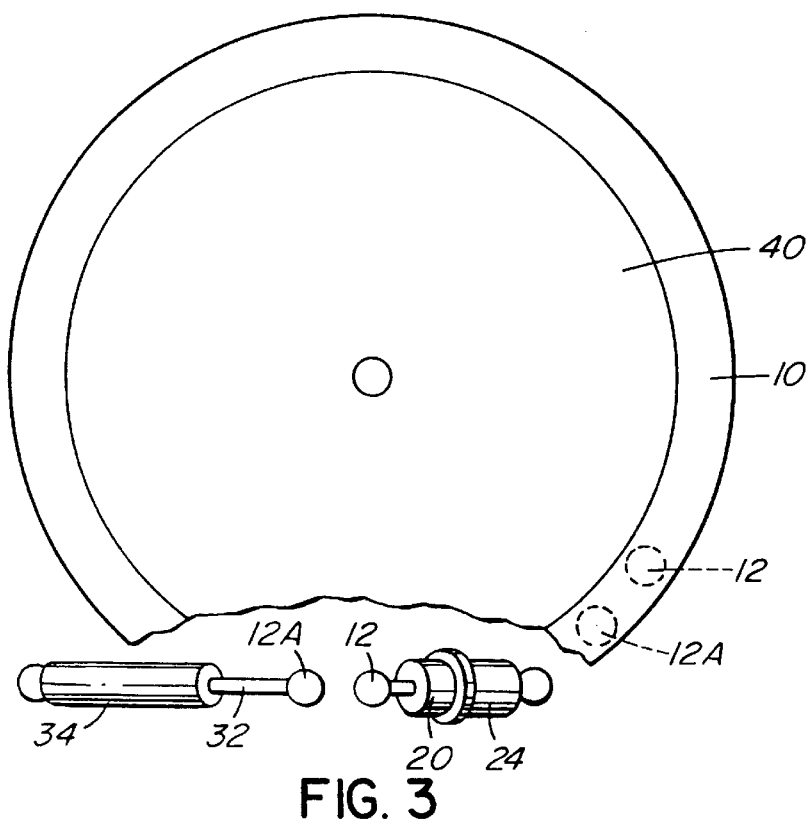
FIG. 3 is a partial top view showing the helical conveyor of FIG. 2.
Figure 2:
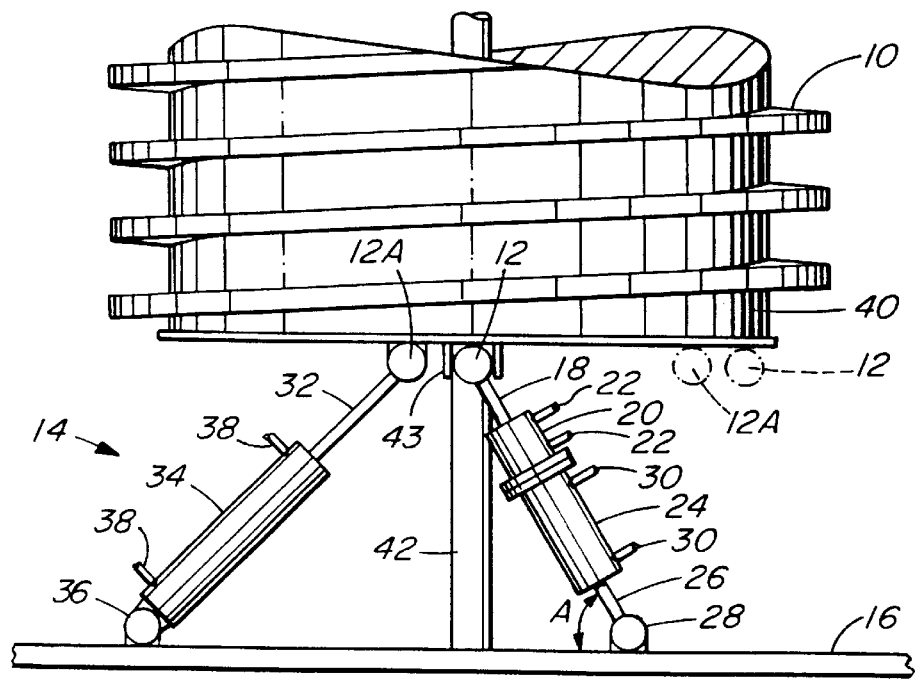
FIG. 2 is a side elevational view showing a helical conveyor guided on a central axis with a reciprocating vibrator hydraulic cylinder positioned underneath.

A helical trough 10 is shown in FIGS. 2 and 3 mounted about a cylindrical drum 40 and guided on a vertical axial post 42 by bushings 43 at the top and bottom of the drum 40. The vibrating device 14 is substantially the same as that shown in FIG. 1 with the exception that piston arm 32 of the vector hydraulic cylinder 34 is connected to a vector pivotal support 12A spaced a short distance from the first pivotal support 12 mounted under the drum 40. The vector cylinder 34 as well as setting the vector angle, also provides stability preventing collapse of the helical trough 10 which is free to move about the axial post 42. Whereas the pivotal supports 12, 28 and 36 for the vibrator cylinder 20, the length adjuster cylinder 24 and the vector cylinder 34 are, all pin supports, as shown in FIG. 1, allowing rotation only in one plane, in the case of a helical conveyor, as shown in FIGS. 2 and 3, these supports are universal joints allowing compound movement in two directions. A negative vector angle A is shown in dotted lines.

Figure 4:
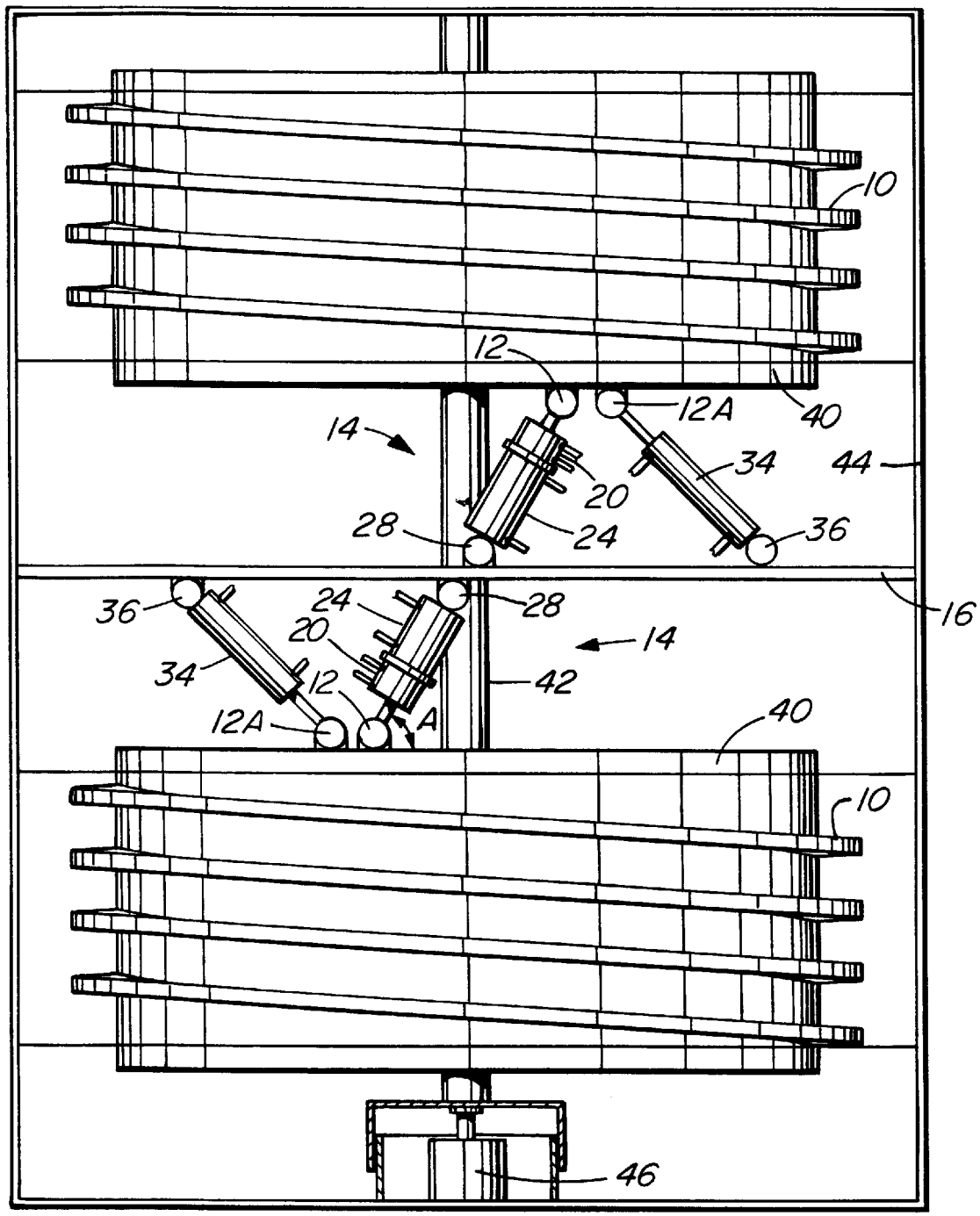
FIG. 4 is a side elevational view showing two helical conveyors guided on the same central axis with reciprocating vibrator hydraulic cylinders mounted on either side of a common base plate positioned between the two conveyors.

FIG. 4 illustrates a duplex configuration showing upper and lower helical fluidizer conveyors 10 guided on a single axis 42 with a fixed common base plate 16 therebetween. The vibrating arrangements 14 are substantially the same as shown in FIG. 2, and are mounted between the two helical conveyors 10. The base plate 16 is supported by an outer shell 44. The upper conveyor is supported by the base plate 16 and the lower conveyor is supported on a pneumatic cushioned base 46 to equalize the static reactions on the base plate 16. The vibrator cylinders 20 are arranged so that the angle A is substantially the same for both cylinders, thus there is a common place of vibration for the two conveyors. The amplitude and frequencies of vibration are set and synchronized so that the vibrational forces from the two vibrator cylinders 20 are equal and opposite thus counteract one another and eliminate vibration forces to the supporting structure.

Figure 5:
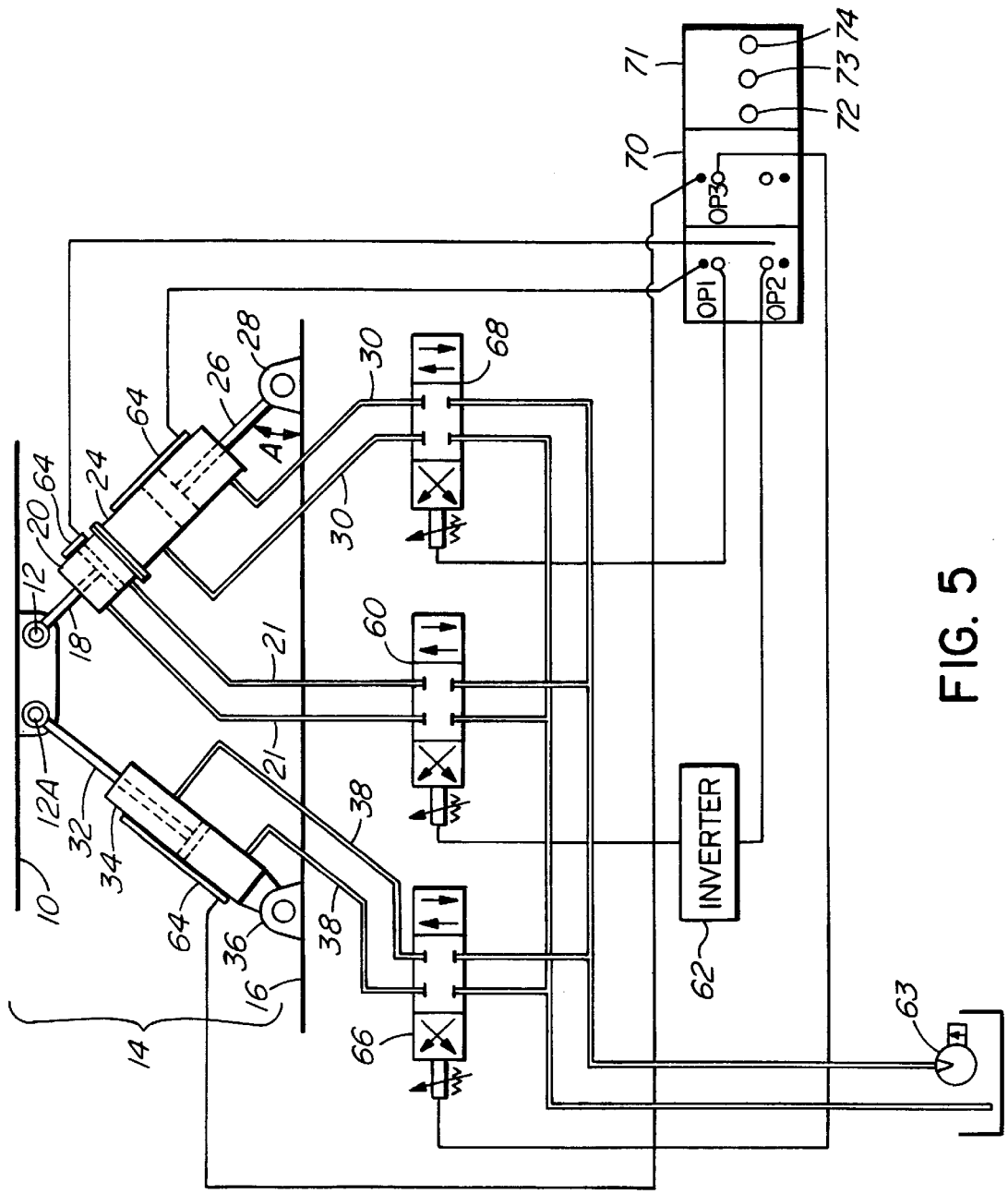
FIG. 5 is a schematic diagram showing the hydraulic and electrical control system for the reciprocating vibrator hydraulic cylinder and the variable length vector link according to one embodiment of the present invention.

FIG. 5 illustrates the workings of the vibrating device 14. A vibrator proportional valve 60 is connected to the hydraulic lines 21 of the vibrator cylinder 20. The proportional valve 60 reciprocates with the frequency controlled by an inverter 62, thus hydraulic flow from the hydraulic lines are alternately reversed causing the vibrator cylinder 20 to vibrate the piston arm 18. The pressure in the hydraulic lines is controlled from a compensating hydraulic pump 63. The hydraulic pump 63 supplies high pressure hydraulic fluid to all the valves. The vector cylinder 34 has a proportional valve 66 connected to the hydraulic lines and the length adjuster cylinder 24 also has a proportional valve 68 connected to the hydraulic lines.

All the cylinders 20, 24 and 34 have linear position transducers 64 to sense and control the position of the piston arms 18, 26 and 32. The position transducers 64 interact with a programmed logic computer 70 which is programmed to control the frequency and amplitude of the vibrator cylinder 20 through the proportional valve 60. The vector angle A is adjusted by controlling the extension of the piston arm 32 of the vector cylinder 34 through the proportional valve 66. With a set angle A, the computer 70 is programmed to adjust the length of the piston arm 26 of the length adjusting cylinder 24 through the proportional valve 68 and integrate with the length of the piston arm 32 of the vector cylinder 34 through the proportional valve 66 to maintain a constant distance between the bottom of the conveyor trough 10 and the base plate 16.

For separate control of amplitude, frequency and vector angle, the operator utilizes an operator interface 71 with separate inputs for amplitude 72, frequency 73 and vector angle 74 to the programmed logic computer 70. These become set points for any particular condition.

By utilizing the operator interface 71 and knowing the characteristics of the particulate material, one is able to control fluidization of the particulate material in the trough. This is controlled by the frequency of the vibrator cylinder 20, the amplitude of the frequency of the vibrator cylinder 20 and also by the vector angle A which effects the speed as well as the fluidization. Furthermore, the direction of the particulate material in the trough is controlled by varying the vector angle A between +45° and −45°. The speed is controlled by a combination of the vector angle A together with variation of the amplitude and frequency of the vibrator cylinder 20. If the amplitude is greater for a given angle A, then the speed is also greater.

If the frequency and amplitude are set for a required degree of fluidization, then a change in the vector angle changes the amplitude of vibration which in turn changes the degree of fluidization. When the angle A is 90°, then the amplitude from the vibrator hydraulic cylinder is at its maximum, when the vector angle A is 45°, then the amplitude is at its minimum. Also, at a 45° vector angle, there is a horizontal component of vibration and this causes movement of the particulate material on the conveyor. For any fixed amplitude and frequency the degree of fluidization increases as the vector angle increases, and decreases as the vector angle decreases. In order for fluidization to remain constant, the amplitude must change. In order for the speed of particulate material to remain constant, the frequency must change. The operator interface 71 permits a user to set required direction, speed and degree of fluidization for a specific particulate material.

In a preferred embodiment the amplitude range is 0.010" to 0.060" and the frequency range is 700 cpm to 1500 cpm. It has been found that this range provides adequate fluidization and speed control for particulate material.

Whereas the vector link is shown as a vector cylinder 34 and the length adjuster is shown as a cylinder 24, these hydraulic cylinders may be replaced by mechanical links such as a screw mechanism. The purpose of the vector link and length adjuster is to change the vector angle A and also to change the length of the combined vibrator cylinder 20 and length adjuster cylinder 24.

Various changes may be made to the embodiments shown herein without departing from the scope of the present invention which is limited only by the following claims.

The embodiments of the present invention in which an exclusive property or privilege is claimed are defined as follows:

1. A fluidizer conveyor comprising:
   a trough to hold and convey a particulate material in a plane of movement;
   at least one reciprocating vibrator hydraulic cylinder with a first pivotal support under the trough and a second pivotal support on a base, the hydraulic cylinder being positioned so that the particulate material moves in the plane of movement;
   first control means for the vibrator hydraulic cylinder to control amplitude of vibration;
   second control means for the vibrator hydraulic cylinder to control frequency of vibration;
   at least one variable length vector link pivotally mounted between the trough and the base in the plane of movement, and
   vector positioning control means to vary the length of the vector link to determine a vector angle of the vibrator hydraulic cylinder in the plane of movement.

2. The fluidizer conveyor according to claim 1 wherein the trough is linear and supported by at least two vibrator hydraulic cylinders each having a vector link from the first pivotal support on the trough to the base.

3. The fluidizer conveyor according to claim 1 wherein the vector link includes a vector hydraulic cylinder and wherein a length adjuster cylinder is positioned in line with the vibrator hydraulic cylinder to control the distance between the first pivotal support and the second pivotal support.

4. The fluidizer conveyor according to claim 1 wherein the vibrator hydraulic cylinder is double acting and the second control means for the vibrator hydraulic cylinder includes a proportional valve and an inverter.

5. The fluidizer conveyor according to claim 3 wherein the vector hydraulic cylinders are double acting and the vector positioning control means includes a proportional valve.

6. The fluidizer conveyor according to claim 1 wherein the trough is curved and vibrated by at least two vibrator hydraulic cylinders, each of the vibrator hydraulic cylinders having a vector link associated therewith.

7. The fluidizer conveyor according to claim 5 wherein the vector positioning control means provides variation in the vector angle from about +45° to about −45°.

8. The fluidizer conveyor according to claim 1 wherein the first control means for the vibrator hydraulic cylinder provides variation of the amplitude from about 0.010" to 0.060".

9. The fluidizer conveyor according to claim 1 wherein the second control means for the vibrator hydraulic cylinder provides variation of the frequency from about 700 cpm to 1500 cpm.

10. The fluidizer conveyor according to claim 1 wherein the trough has a helical configuration which is centrally guided on a vertical axis, and is vibrated by at least two vibrator hydraulic cylinders each having a length adjuster cylinder in line with each of the vibrator hydraulic cylinders to control the distance between the first pivotal support and the second pivotal support.

11. The fluidizer conveyor according to claim 10 wherein substantially similar upper trough and lower trough of helical configuration are each centrally guided on a single vertical axis and supported by at least two vibrator hydraulic cylinders, the at least two vibrator hydraulic cylinders mounted on a top side and a bottom side of a common base plate positioned substantially on a common line, and wherein the first and second control means for the vibrator hydraulic cylinders balances reaction forces of vibration from the upper and lower helical troughs.

12. The fluidizer conveyor according to claim 11 wherein the lower trough is supported by a pneumatically cushioned support.

* * * * *